United States Patent Office 3,280,456
Patented Oct. 25, 1966

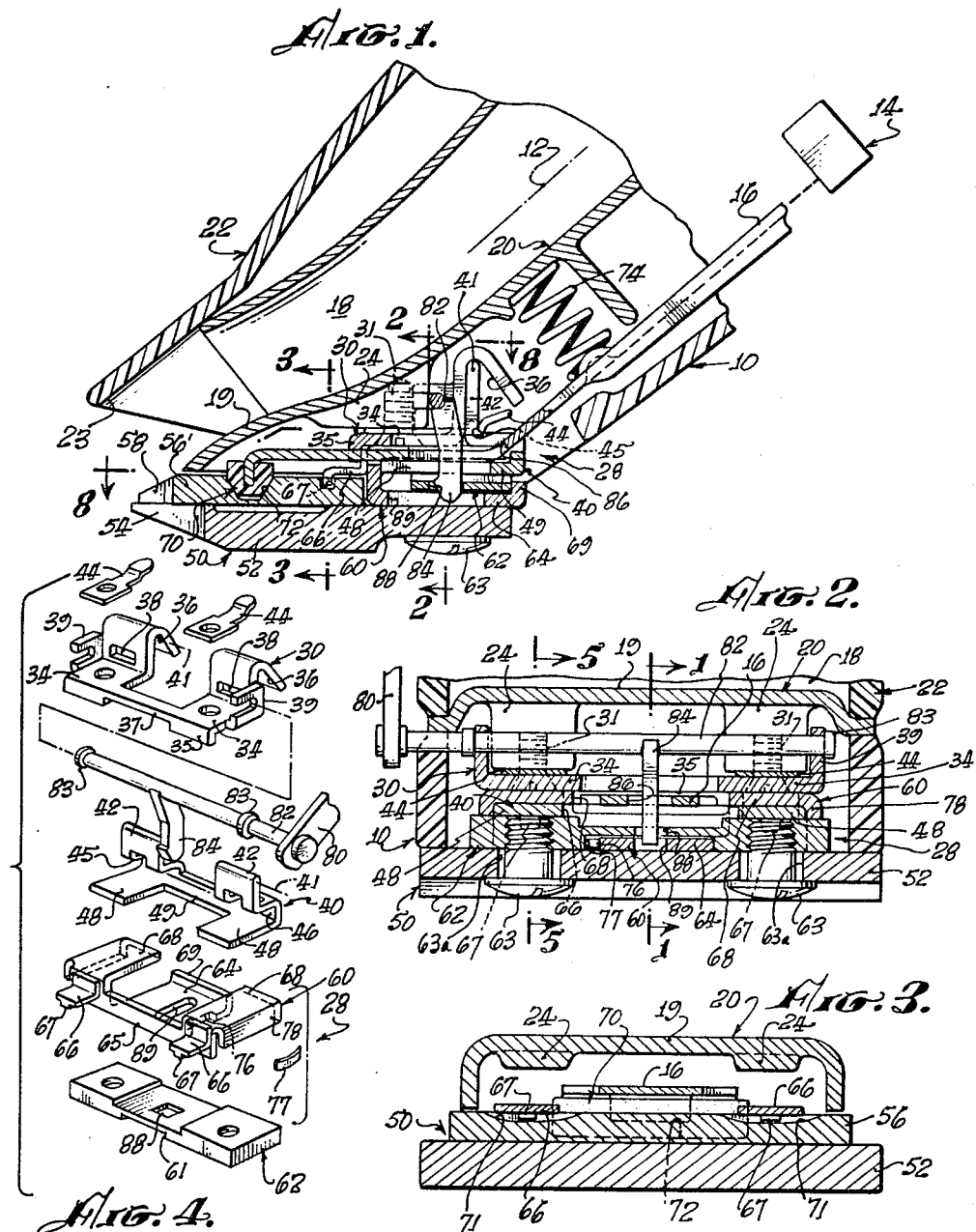

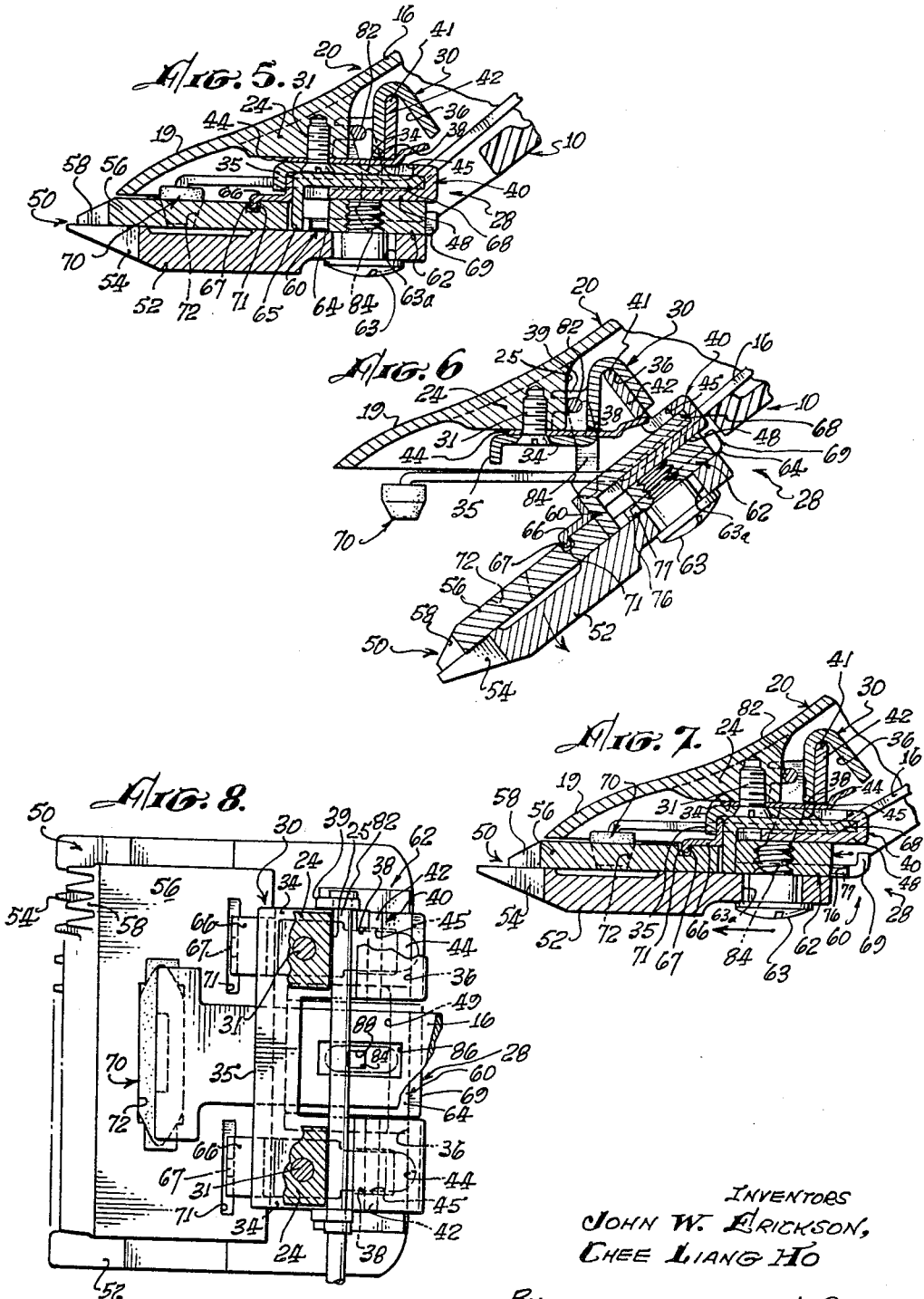

3,280,456
CUTTING HEAD STRUCTURE FOR HAIR CLIPPERS
John W. Erickson, Huntington Beach, and Chee Liang Ho, Pasadena, Calif., assignors to Preco Incorporated, Los Angeles, Calif., a corporation of California
Filed Oct. 29, 1964, Ser. No. 407,385
13 Claims. (Cl. 30—133)

This invention has to do with power driven hair clippers, and relates more particularly to improved cutting head structure for such hair clippers.

An important object of the present invention is to provide a cutter head for hair clippers wherein the comb blade and cutting blade can be readily detached from the body of the clipper as a unitary structure. Disassembly of the blades as a structural unit makes for convenient sterilization and permits rapid interchange of two or more different blade assemblies during a clipping operation.

A further object of the invention is to provide a clipper head structure that is conveniently adjustable to vary the depth of cut, that is, the length of hair that is produced by the cutting operation.

A number of prior art structures have been described which provide either interchangeable blades or continuous adjustment of a single set of blades. However, the present invention has the particular advantage of providing continuous adjustment of the cutting action in a cutter head that is also conveniently interchangeable. That dual action effectively provides continuous adjustment of the cutting action over a very wide range. In contrast, a cutter head in which the blades are interchangeable but not adjustable can only provide certain discrete types of action, while a cutter head that is adjustable but does not provide interchangeability of blades is sharply limited in its range of variation.

The present structure is superior in several important respects to cutter head disclosed in Patent 2,306,039 issued to Joseph Cromonic on December 22, 1942. In particular, the present structure accomplishes adjustment of the cutting action by shifting the position of the lower blade, usually referred to as the comb blade, in a direction normal to its oscillatory cutting movement, rather than by shifting the cutting blade. The present type of adjustment permits the driving element to engage the cutting blade at a fixed point, maintaining optimum cutting action, rather than at a point that is variable laterally of the blade. That advantage is especially important when pressure between the two blades is produced by application of spring force to the cutting blade via the drive member.

A further advantage of the present structure over that of the patent just referred to is that the location of the cutting action, which is defined primarily by the relatively short teeth of the cutting blade, remains fixed relative to the body of the clipper regardless of the condition of adjustment of the comb blade. That uniformity of action facilitates operation of the clipper, and is especially important in a hair clipper in which the cuttings are automatically removed, as by an airstream that is drawn over the cutting area of the blades. With the present structure the effectiveness of such an airstream is not diminished by adjustment of the relative position of the two blades, since the region of cutting action remains fixed relative to the body of the clipper and hence relative to the mouth of the air passage.

In accordance with one aspect of the present invention, a blade assembly is provided wherein the comb blade and the cutting blade are movably mounted with respect to a bracket member so that the cutting blade is movable parallel to the line of cutting teeth and the comb blade is movable transversely of that direction. Conveniently releasable latch mechanism is provided for mounting the bracket member in a defined operating position on the clipper frame. Latch release then permits disassembly of both blades as a structural and interchangeable unit.

In accordance with a further aspect of the invention, each blade assembly is adjustable independently of other blade assemblies to obtain the desired range of adjustment of the length of cut when assembled with a particular clipper. In particular, each blade assembly may be set to produce safely the closest practicable cut.

A full understanding of the invention and of its further objects and advantages will be had from the following description of an illustrative manner of carrying it out. The particulars of that description and of the drawings which form a part of it are intended only as illustration, and not as a limitation upon the scope of the invention, which is defined in the appended claims.

In the drawings:
FIG. 1 is an axial section on the line 1—1 of FIG. 2, representing an illustrative embodiment of the invention;
FIG. 2 is a transverse section on the line 2—2 of FIG. 1;
FIG. 3 is a transverse section on the line 3—3 of FIG. 1;
FIG. 4 is an exploded schematic perspective representing certain structural elements;
FIG. 5 is a section on the line 5—5 of FIG. 2;
FIG. 6 is a section corresponding to FIG. 5, but showing the device in position for blade removal;
FIG. 7 is a section corresponding to FIG. 5, but showing the device in another position of blade adjustment; and
FIG. 8 is a generally horizontal section on the line 8—8 of FIG. 1.

The structure of the present invention is illustrated in connection with a hair clipper that comprises an elongated body 10 with longitudinal axis 12. Power mechanism of any suitable type is mounted within body 10, as indicated schematically at 14, and drives the cutting action of the clipper head to be described. That drive is transmitted by means of the elongated drive arm 16, the outer end of which carries the coupling formation 70 and oscillates along an essentially linear path perpendicular to the plane of FIG. 1. Power means 14 may comprise an electric motor and coupling mechanism of known type. In the present embodiment, however, power is derived from the suction side of a vacuum cleaner, which draws air inward through the air passage 18 and through an air turbine, not explicitly shown. The latter type of power drive for a hair clipper is further described and claimed in the copending patent application, Serial No. 372,649, filed on June 4, 1964 by Gerald M. Magarian under the title of "Air-Powered Cutting Tool for Hair and the Like" and assigned to the same assignee as the present application. An air passage similar to passage 18 may be provided also in an electrically powered hair clipper, serving in either case the useful purpose of removing the cuttings from the cutting area and disposing of them in the filter bag of the vacuum cleaner.

For clarity of description the present illustrative clipper structure will be assumed to be oriented as in FIG. 1, the forward direction then being to the left and the rearward direction to the right. Air intake passage 18 is bounded on its lower side by the wall 19 which forms a part of the main structural frame 20 of the clipper. Clipper body 10 also comprises a housing shell 22, typically formed at least in part of molded plastic, the forward edge of which at 23 defines the inlet opening of passage 18 opposite wall 19. Two laterally spaced mounting bosses 24 are provided on wall 19 externally of duct 18 for mounting the support structure for the clipper head to be described.

That support structure is indicated generally by the numeral 28 and comprises the frame member 30, fixedly mounted on bosses 24 by the screws 31, and the clamp member 40, which is pivotally swingable with respect to frame member 30 between clamping and releasing positions (FIGS. 5 and 6, for example).

Frame member 30 (FIG. 4) is typically formed of sheet metal, with two flat coplanar mounting portions 34 which fit against the lower faces of mounting bosses 24 and are bored to receive the mounting screws 31. A downwardly projecting flange 35 extends along the forward edge of each portion 34. Flanges 35 act as positioning rails for the blade assembly, as will be more fully described. The rearward edges of mounting portions 34 are deeply flanged to form channels 36 of inverted V-form. The two mounting portions 34 and channels 36 are rigidly joined by the web 37 to form a unitary whole of generally U-form. The outer edges of mounting portions 34 are upwardly flanged to form ears 39 which are slotted to journal the operating shaft for the blade adjustment, as will more fully appear. The channels 36 are mutually alined, forming in effect a continuous channel transverse of the longitudinal axis of the clipper, the inner apex of which forms effectively a transverse pivot axis 41 for the swinging movement of the clamp member 40.

Clamp member 40 (see FIG. 4) comprises two similar laterally spaced formations rigidly joined by the web structure 49. Each formation includes an upwardly extending mounting arm 42 and a forwardly extending clamping arm 48. The upper ends of mounting arms 42 are preferably rounded and engage the correspondingly rounded internal apex of channel 36, forming effectively a pivot structure for the swinging movement of the clamp member. Each of the arms 42 is apertured at 45 to receive the working ends of the respective springs 44. Those springs are typically mounted by clamping action of screws 31 between frame member 30 and the lower faces of mounting bosses 24. The springs extend rearwardly from bosses 24 through clearance apertures 38 in frame 30 which define the spring position about screws 31. The free end portion of each spring is bent to form two oppositely oblique cam faces. Springs 44 are prestressed to press upwardly on clamp member 40 at the follower surfaces formed by apertures 45, the spring cam faces acting as detents to urge rotation of the clamp member about pivot axis 41 in one direction or the other. The clamp member is thereby snapped either forward into clamping or closed position close to the forward face of channel 36 (FIG. 5), or rearwardly into released or open position defined by the rearward face of channel 36 (FIG. 6). In closed position of the clamp member, clamp arms 48 extend essentially parallel to frame member 30; while in open position they extend obliquely downward as in FIG. 6. Clamp member 40 is formed with a transverse channel 46 between mounting arms 42 and clamp arms 48 (FIG. 4), providing a convenient defining formation for receipt of the blade assembly.

The blade assembly, indicated generally by the numeral 50, comprises the comb blade 52 with teeth 54 along its forward edge, the cutting blade 56 with corresponding teeth 58, and the bracket member 60. A bridge piece 62 is secured to the upper face of comb blade 52 by the screws 63. Those screws preferably enter slotted holes 63a in the blade, permitting adjustment of the relative positions of bridge piece and comb blade. However, when screws 63 are tightened, as during normal operation, the bridge piece may be considered to form a part of that blade. The configuration of bracket 60 is such that the two blades are movably mounted on it to form the permanent blade assembly 50 so long as bridge 62 remains assembled to the comb blade. However, removal of the screws 63 permits all four parts to be disassembled, as for sharpening of the blade teeth or other service. The lower face of bridge piece 62 is channeled at 61 to form with the comb blade a guide slot; and its upper face is channeled to provide increased clearance from operating lever 16.

Bracket 60 (FIG. 4) comprises a central rearwardly extending slide arm 64 joined by a web structure 65 to laterally spaced formations each of which comprises a forwardly extending arm 66 and a rearwardly extending mounting arm 68. Slide arm 64 serves to couple the bracket movably to comb blade 50, extending with a close sliding fit through the guide slot formed between the central portion of bridge 62 and the upper face of the blade. The rearward end of arm 64 is bent upward at 69, behind bridge 62, retaining the arm in that opening unless the bridge is disassembled from the blade. The length of bracket arm 64 between web 65 and retaining formation 69 permits limited sliding movement of the comb blade and bridge assembly longitudinally of that arm. That translational movement is transverse of the length of the blades and is guided by the parallel sides of arm 64. Possible side play in that sliding movement is preferably eliminated by spring means of any suitable type. As illustrated, one side edge of bracket arm 64 is slotted at 76 to receive the spring 77 (FIG. 2). Spring 77 is bent so that its central portion extends out of slot 76 and frictionally engages bridge member 62, causing arm 64 to be guided effectively positively at its opposite edge.

Bracket arms 66 carry bosses 67 on their lower faces, adapted to enter channels 71 formed in the upper face of cutting blade 56 when the latter is in normal working position on the upper face of comb blade 52. The parts are so dimensioned that the two blades are thereby retained approximately in working relation but without pressure between them. The elongation of channels 71 in a direction parallel to the length of cutting blade 56 permits that blade to perform its normal translational cutting movement relative to the comb blade 52 and to the bracket. Moreover, bosses 67 are received in channels 71 with appreciable lateral clearance, so that in operation the cutting blade position in its own plane is defined entirely by drive arm 16 (see below). The movement of comb blade 52 along slide arm 64 causes relative movement of the two blades in a direction perpendicular to their cutting movement, as seen best by comparison of FIGS. 5 and 7. That produces a modification of the cutting action of the blade teeth, since hair is cut only if it projects upwardly between the teeth of the comb blade far enough to reach the cutting blade.

The rearwardly extending upper bracket arms 68 are spaced upwardly from the upper face of bridge 62, forming with that face a channel adapted to receive clamp arms 48 of the clamp member 40. The ends of mounting arms 68 are received in turn in the channel 46 formed by the U-shaped clamp arms 48. The fit of those interengaging parts is preferably quite free, facilitating assembly and disassembly of blade unit 50 when the clamp is in released position, as in FIG. 6. Rotation of the clamp to closed position, as in FIG. 5, for example, then grips bracket mounting arms 68 tightly between clamp arms 48 and the lower face of fixed frame member 20. Flanges 35 are dimensioned to fit closely the forward edges of bracket mounting arms 68, accurately confining the bracket and hence the entire blade assembly to its correction longitudinal working position when clamp 40 is closed. The lateral position of the blade assembly is also positively defined by suitable guide surfaces. As illustrated, that guiding action is provided by the downwardly extending flanges 78 along the outer edges of bracket arms 68. Those flanges fittingly enclose the outer edges of clamp arms 48 of clamp member 40 (FIG. 2), establishing the correct lateral relation of members 40 and 60. That accurate locating action, however, relates directly only to bracket member 60, and does not interfere with the respective blade movements relative to the brackets that have already been described.

The cutting movement of upper blade 56 is driven, as already indicated, by oscillating movement of drive arm 16. The forward end of that arm carries the drive formation 70, which may be of conventional type and engages a fitting well 72 in the upper face of the cutting blade, positively positioning the blade in its own plane. The lower edges of drive formation 70 are preferably beveled, as indicated in the drawings, to insure its entering well 72 when the blade assembly is snapped into working position from the loading position of FIG. 6. Cutting pressure between the two blades is preferably applied to cutting blade 56 via drive lever 16, as from the spring 74 which does not frictionally resist the cutting movement. When clamp 40 is opened, the downward movement of lever 16 is limited by a stop of any suitable type, such as the edge of cover 10 (FIG. 5). Lever 16 extends between the two spaced mounting arms 42 of clamp 40 and also between its two spaced clamp arms 48. Lever 16 also extends between the two spaced mounting arms 68 of bracket 60 and between its forwardly extending arms 66. All of those arms are spaced from the lever far enough to provide ample clearance for its driving movement.

The sliding movement of comb blade 52 along bracket slide 64 is driven manually by operation of a handle 80, fixedly mounted on the cross shaft 82. That shaft is journaled in horizontal slots in the tabs or flanges 39, in which it is retained by the rear surfaces 25 of bosses 24. The shaft is axially positioned by the collars 83. A control lever 84 is fixedly mounted centrally of the shaft, and extends downward between the mounting portions of frame 30 and through a clearance aperture 86 in drive lever 16. The lower end of control lever 84 enters the fitting aperture 88 in bridge member 62. A clearance aperture 89 is preferably provided in slide 64 of bracket 60 for the extreme end of control lever 84. That end is beveled to facilitate entrance into the aperture in the bridge as the blade assembly is snapped into operating position. With lever 84 thus coupled to the bridge and comb blade unit, rotation of shaft 82 under the control of handle 80 causes translational movement of the comb blade along bracket slide 60 over a range that is typically defined by the length of the uniform slide section between web 65 and retaining formation 69 of bracket slide arm 60 (compare FIGS. 5 and 7).

Whereas the range of that adjustment is thus sharply defined by dimensioning of the interchangeable blade unit itself, the actual relationship between the two blades during operation may depend also upon such factors as manufacturing tolerances and possible wear in other parts of the mechanism, particularly in cutter drive lever 16 and its coupling 70 to the cutting blade. The present structure provides compensation for such factors by permitting adjustment of the comb blade relative to bridge member 62. In typical practice, with blade assembly 50 in operating position and with control handle 80 moved to its most forward position (FIG. 5), screws 63 are loosened and the comb blade is shifted relative to bridge member 62 until it has the desired relationship to cutting blade 56. Adjustment is provided in both coordinates in the plane of the blade. Adjustment of the comb blade parallel to the row of teeth insures proper phase relation of the teeth on the respective blades. Adjustment transversely of the row of teeth is especially useful for obtaining proper cooperation of the two blades at the extreme forward position of handle 80, which produces the shortest available cut. In that adjustment care is taken that comb teeth 54 extend beyond cutting teeth 58 a suitable distance to prevent accidental cutting of the skin. By providing the described adjustment, which can be carried out with the clipper in fully assembled condition, the blade setting for shortest cut can be adjusted to suit the preference of each operator and to eliminate any variation due to manufacturing tolerances or wear. That adjustment alters only the blade assembly and does not disturb the adjusted condition of other blade assemblies that may be used on the same machine.

In operation of the invention, with clamp member 40 in released position (FIG. 6) blade assembly 50 may be freely slid on and off the forwardly projecting clamp arms 48. When one blade assembly is thus removed from the cutter head, another may be inserted, and is laterally positioned by the flanges 78 on bracket 60. The clamp member may then be snapped to closed position (FIG. 5), firmly locking the bracket member of the new blade assembly in correct operating position with relation to the clipper frame. That action also causes the drive formation 70 to enter recess 72 in the cutting blade ready to drive the latter in its cutting movement, and inserts control lever 84 into aperture 88 of bridge member 62, ready to control the position of comb blade 52 for varying the depth of cut.

It is to be noted that adjustment of the depth of cut does not disturb the relation of cutting blade 56 either to its drive connection or to the mouth of air intake conduit 18. Thus, the force of spring 74 continues to be applied to the cutting blade via drive arm 16 at the correct distance from teeth 58 to give proper distribution of the pressure between the two blades. And as the depth of cut is varied by movement of handle 80 the cutting action takes place always just within the projected air conduit wall 19, neither obstructing the conduit mouth by jutting farther into it nor receding from the mouth and thereby reducing the effectiveness of the air stream in drawing all cuttings into the conduit.

It will be understood that many changes can be made in the particulars of the disclosed illustrative embodiment without departing from the proper scope of the invention, which scope is defined in the appended claims.

We claim:

1. In a hair clipper having a body and a cyclically movable drive element mounted on the body, the combination of
   bracket means,
   a comb blade having a row of comb teeth and mounted on the bracket means for translational movement relative thereto in a direction transverse of the row of teeth,
   a cutting blade having a row of cutting teeth and mounted on the bracket means in face to face contact with the comb blade with the rows of teeth of the respective blades in mutually parallel operative relation, the cutting blade being movable in translation relative to the comb blade and the bracket means longitudinally of the rows of teeth,
   latch means for releasably mounting the bracket means on the body in positively defined working position relative thereto,
   formations on said drive element and on the cutting blade, respectively, interengageable in working position of the bracket means for driving said movement of the cutting blade to produce cutting action of the teeth,
   and control means on the body interengageable with the comb blade in working position of the bracket means and manually actuable to adjustably drive said movement of the comb blade to vary the cutting action of the teeth,
   the bracket means and the two blades being removable as a unit from the body on release of said latch structure.

2. In a hair clipper having a body and a cyclically movable drive element mounted on the body, the combination of
   a bracket member,
   a comb blade having a working face and a row of comb teeth along one edge thereof,
   a cutting blade having a working face and a row of cutting teeth along one edge thereof,
   means for mounting the comb blade and the cutting blade on the bracket member with their working faces in mutual sliding contact and with the rows of teeth of the respective blades in mutually parallel operative relation, the cutting blade being movable in translation relative to the bracket member and to the mounted comb blade parallel to said working faces and longitudinally of the rows of teeth, and the comb blade being movable in translation relative to the bracket member and to the mounted cutting blade parallel to said working faces and transversely of the rows of teeth, latch means for releasably mounting the bracket member on the body in positively defined working position relative thereto, formations operatively coupled to said drive element and to the cutting blade, respectively, and interengageable in working position of the bracket member for driving said movement of the cutting blade to produce cutting action of the teeth, and control means on the body interengageable with the comb blade in working position of the bracket member and manually actuable to adjustably drive said movement of the comb blade to vary the cutting action of the teeth, the bracket member and the two mounted blades being removable as a unit from the body on release of said latch structure.

3. The combination defined in claim 2, and wherein said mounting means includes means actuable to adjustably vary the relative positions of the mutually contacting blades in a direction parallel to the rows of teeth independently of said driving engagement between the cutting blade and the driving element.

4. The combination defined in claim 2, and wherein said mounting means include abutment means acting to positively limit said movement of the comb blade at least in the direction tending to cause the cutting teeth to project beyond the comb teeth, and means for adjustably varying the position of said abutment means longitudinally of said comb blade movements.

5. The combination defined in claim 2, and wherein said mounting means include a support member, means for mounting the support member with respect to the bracket member for translational movement relative thereto transversely of the row of teeth of the mounted cutting blade, and means for mounting the comb blade with respect to the support member in a position that is adjustably variable transversely of the row of comb teeth.

6. In a hair clipper having a body and a drive element mounted on the body and oscillatable relative thereto along an essentially rectilinear path, the combination of a clamp member mounted on the body for pivotal movement about a pivot axis parallel to said path between respective clamping and releasing positions and having a mounting formation that extends generally radially with respect to said axis, bracket means releasably interengageable with the mounting formation of the clamp member in releasing position thereof, the bracket means being locked in positively defined position with respect to the body in clamping position of the clamp member, a generally flat comb blade having a working face and a row of comb teeth along one edge thereof, a generally flat cutting blade having a working face and a row of cutting teeth along one edge thereof, means for mounting the comb blade and the cutting blade with respect to the bracket means with their working faces in mutual sliding contact and with the rows of teeth in mutually parallel operative relation, said mounting means comprising guide means mounted on the comb blade and on the bracket means, respectively, and normally acting to guide translational movement of the comb blade relative to the bracket means parallel to said working faces and transversely of the rows of teeth, and guide means mounted on the cutting blade and on the bracket means, respectively, and normally acting to guide translational movement of the cutting blade relative to the bracket means parallel to said working faces and longitudinally of the rows of teeth, respective formations operatively coupled to said drive element and to the cutting blade and interengageable in said locked position of the bracket means for driving said movement of the cutting blade in response to oscillation of the drive element to produce cutting action of the teeth, and manually actuable means for controlling said translational movement of the comb blade.

7. The combination defined in claim 6, and wherein the first said guide means include abutment means acting to positively limit said movement of the comb blade at least in the direction tending to cause the cutting teeth to project beyond the comb teeth, and means for adjustably varying the position of said abutment means lontigudinally of said comb blade movement.

8. The combination defined in claim 6, and wherein the first said guide means include support structure, means mounting the comb blade on the support structure in a relative position that is adjustably variable in a direction parallel to the comb blade working face, and guide formations mounted on the support structure and the bracket means, respectively, and normally acting to guide translational movement of the support structure and the mounted comb blade relative to the bracket means parallel to said working faces and transversely of the rows of teeth.

9. The combination defined in claim 8, and wherein said manually actuable means comprises a manually movable control element mounted on the body, and respective formations operatively coupled to the control element and to the support structure, respectively, and interengageable in said locked position of the bracket means for driving said translational movement of the support structure.

10. The combination defined in claim 8, and including also abutment means mounted on the support structure and on the bracket means, respectively, and acting to positively limit said translational movement of the support structure relative to the bracket means at least in the direction tending to cause the cutting teeth to project beyond the comb teeth.

11. In a power driven hair clipper having a body, an oscillatable drive element mounted on the body, a comb blade with a row of comb teeth, and a cutting blade with a row of cutting teeth, the combination of releasable leatch means engageable for mounting the comb blade on the body for translational movement relative to the body transversely of the row of comb teeth and for mounting the cutting blade on the body in cutting relation to the comb blade and for translational cutting movement relative to the body parallel to the row of cutting teeth, the comb blade and cutting blade being both directly removable from the body on release of the latch means, a driving formation on the drive element engageable with the mounted cutting blade at a predetermined distance from the row of cutting teeth for driving said cutting movement, and releasable from the cutting blade on release of said latching means, and control means on the body interengageable with the mounted comb blade for adjustably driving said movement of the comb blade to vary the cutting action of the teeth, and releasable from the comb blade on release of said latching means, said distance of engagement of the driving formation from the cutting teeth being independent of the condition of adjustment of the control means.

12. In a power driven hair clipper having a body, an oscillatable drive element mounted on the body, a comb blade with a row of comb teeth, and a cutting blade with a row of cutting teeth, the combination of releasable latch means engageable for mounting the comb blade on the body for translational movement relative to the body transversely of the row of comb teeth and for mounting the cutting blade on the body in cutting relation to the comb blade and for translational cutting movement relative to the body parallel to the row of cutting teeth, the comb blade and cutting blade being both directly removable from the body on release of the latch means, a driving formation on the drive element engageable with the mounted cutting blade at a predetermined distance from the row of cutting teeth for driving said cutting movement, and releasable from the cutting blade on release of said latching means, spring means acting between the body and the drive element for exerting on the cutting blade at said predetermined distance from the cutting teeth a force directed toward the comb blade to exert cutting pressure between the two blades, and control means on the body interengageable with the mounted comb blade for adjustably driving said movement of the comb blade to vary the cutting action of the teeth, and releasable from the comb blade on release of said latching means, said distance of engagement of the driving formation from the cutting teeth being independent of the condition of adjustment of the control means.

13. In a power driven hair clipper having a body, an oscillatable drive element mounted on the body, a comb blade with a row of comb teeth, and a cutting blade with a row of cutting teeth, the combination of releasable latch means engageable for mounting the comb blade on the body for translational movement relative to the body transversely of the row of comb teeth and for mounting the cutting blade on the body in cutting relation to the comb blade and for translational cutting movement relative to the body parallel to the row of cutting teeth, the comb blade and cutting blade being both directly removable from the body on release of the latch means, a driving formation on the drive element engageable with the mounted cutting blade at a predetermined distance from the row of cutting teeth for driving said cutting movement, and releasable from the cutting blade on release of said latching means, air conduit means having an inlet mouth in predetermined spatial relation to the teeth of the mounted cutting blade, means for drawing air through said inlet mouth into the conduit means to remove cuttings, and control means on the body interengageable with the mounted comb blade for adjustably driving said movement of the comb blade to vary the cutting action of the teeth, and releasable from the comb blade on release of said latching means, said spatial relation between the conduit mouth and the teeth of the cutting blade being independent of the condition of adjustment of the control means.

References Cited by the Examiner
UNITED STATES PATENTS

| | | | |
|---|---|---|---|
| 2,006,493 | 7/1935 | Andis | 30—201 |
| 2,292,453 | 8/1942 | La Mere | 30—133 X |
| 2,306,039 | 12/1942 | Cromonic | 30—201 |
| 2,323,046 | 6/1943 | Jenkins | 30—133 |

WILLIAM FELDMAN, *Primary Examiner.*

J. C. PETERS, *Assistant Examiner.*